United States Patent [19]
Fujimoto et al.

[11] Patent Number: 5,201,173
[45] Date of Patent: Apr. 13, 1993

[54] CATALYST TEMPERATURE CONTROL SYSTEM FOR INTERNAL COMBUSTION ENGINES

[75] Inventors: Sachito Fujimoto; Toshikazu Oketani; Yoshiyuki Abe; Kojiro Tsutsumi, all of Wako, Japan

[73] Assignee: Honda Giken Kogyo Kabushiki Kaisha, Tokyo, Japan

[21] Appl. No.: 827,664

[22] Filed: Jan. 29, 1992

[30] Foreign Application Priority Data

Mar. 26, 1991 [JP] Japan ................. 3-087584

[51] Int. Cl.⁵ ............................................. F01N 3/20
[52] U.S. Cl. ................................ 60/277; 60/278; 60/285
[58] Field of Search ................... 60/277, 278, 285

[56] References Cited
U.S. PATENT DOCUMENTS

| | | | |
|---|---|---|---|
| 3,785,151 | 1/1974 | Holl | 60/278 |
| 3,964,258 | 6/1976 | Romano | 60/278 |
| 4,007,589 | 2/1977 | Neidhard | 60/277 |
| 4,192,140 | 3/1980 | Yamashita | 60/277 |

Primary Examiner—Douglas Hart
Attorney, Agent, or Firm—Nikaido, Marmelstein, Murray & Oram

[57] ABSTRACT

A catalyst temperature control system is provided for an internal combustion engine having a catalyst arranged in the exhaust system for purifying noxious components in exhaust gases emitted from the engine, and an exhaust gas recirculation passage connected to the intake system and the exhaust system for returning part of the exhaust gases from the exhaust system to the intake system. The temperature of a catalyst bed of the catalyst is detected. An ECU increases a recirculation amount of exhaust gases flowing through the exhaust gas recirculation passage, when the detected temperature of the catalyst bed is higher than a first predetermined value, and enriches the air-fuel ratio of a mixture supplied to the engine. when the detected temperature of the catalyst bed is higher than a second predetermined value upon the lapse of a predetermined time period after the start of increase of the recirculation amount.

7 Claims, 11 Drawing Sheets

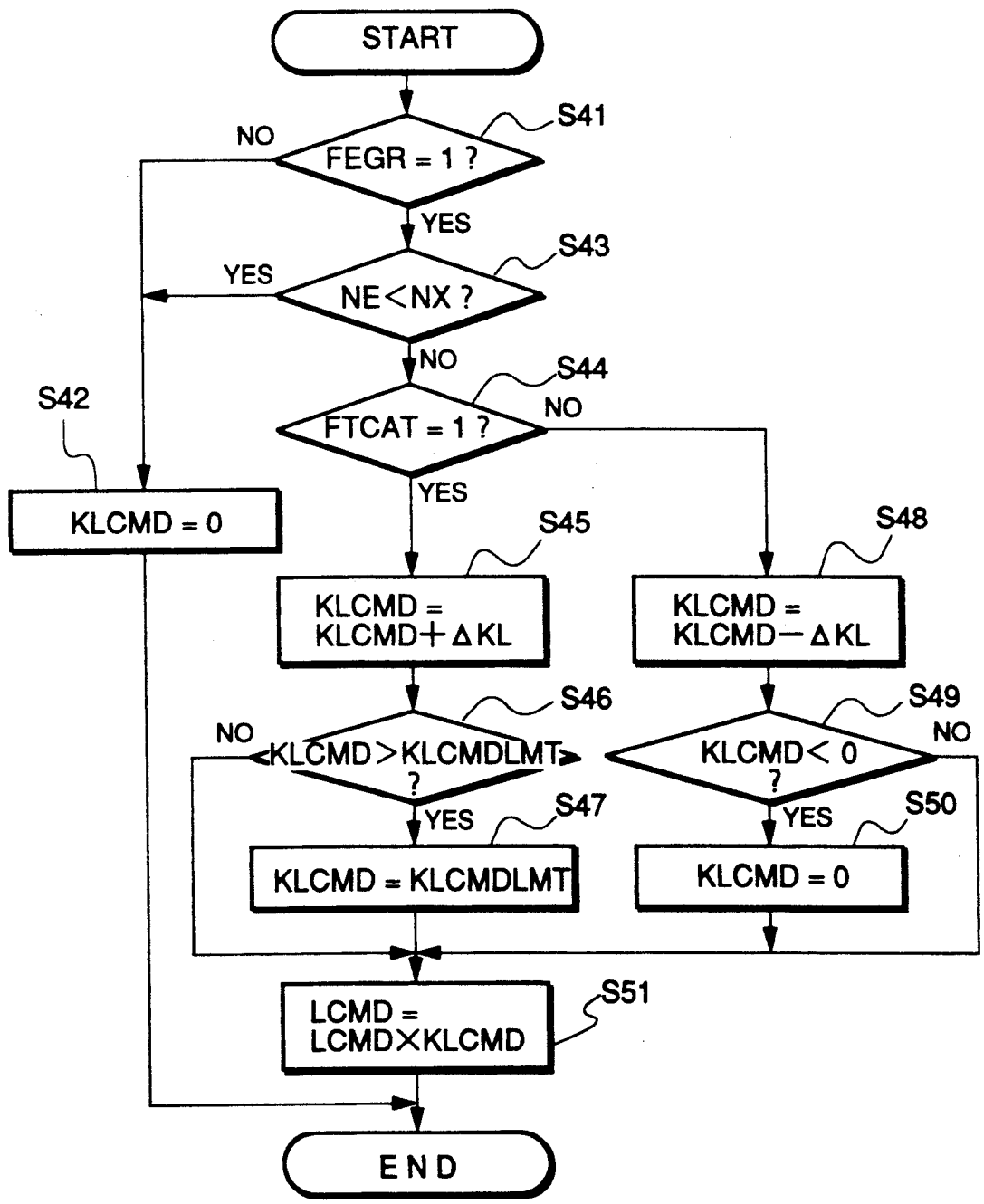

CATALYST TEMPERATURE CONTROL SYSTEM FOR INTERNAL COMBUSTION ENGINES

BACKGROUND OF THE INVENTION

1. Field of the Invention

This invention relates to a catalyst temperature control system for internal combustion engines, and more particularly to a catalyst temperature control system for use in an internal combustion engine provided with a catalytic converter (catalyst) arranged in the exhaust system of the engine for purifying noxious components in the exhaust gases, and an exhaust gas recirculation system for returning part of the exhaust gases from the exhaust system to the intake system.

2. Prior Art

Generally, in order to improve the exhaust gas purifying ability of an internal combustion engine, an exhaust gas purifying device comprising a catalyst is provided in the engine for reducing the amounts of noxious components in exhaust gases emitted from the engine. As such a catalyst, a three-way catalyst is generally employed, which purifies three noxious components, i.e. CO, HC, and NOx in the exhaust gases at the same time. To obtain the best conversion efficiency (exhaust emission purifying efficiency) of the three-way catalyst, the air-fuel ratio of a mixture supplied to the engine is feedback-controlled in response to an output from an exhaust gas ingredient concentration sensor arranged in the exhaust system, so as to make the air-fuel ratio equal to a stoichiometric air-fuel ratio.

However, although the above method of feedback-controlling the air-fuel ratio has the advantage that the three-way catalyst can have a good exhaust emission purifying efficiency without requiring supply of secondary air into the exhaust system, it has the disadvantage that when the engine is operating in a high speed partial load region, the bed temperature of the catalyst can rise to an abnormally high level, resulting in deterioration of the catalyst or burning of same.

To overcome this disadvantage, a control system has been proposed e.g. by Japanese Provisional Patent Publication Kokai) No. 52-153030, which enriches the air-fuel ratio of a mixture supplied to an internal combustion engine to a richer value than a stoichiometric air-fuel ratio so as to lower the catalyst temperature.

According to the proposed control system, by thus enriching the air-fuel ratio to a richer value than the stoiohiometric air-fuel ratio, the three-way catalyst is placed in a reducing atmosphere due to an increased amount of unburnt ingredients in the exhaust gases, whereby oxidizing reaction of the unburnt ingredients is restrained and at the same time reducing reaction (endothermic reaction) of NOx is promoted, to reduce the catalyst temperature.

However according to tests conducted by the present inventors, it has been turned out that if the catalyst is placed in a fairly high temperature state, though not so abnormally high as 800° C., for a long time, it can deteriorate so that the purification rates of CO. HC, and NOx become degraded.

FIG. 1 shows deterioration characteristics of a three-way catalyst in terms of purification rates (%), obtained after endurance tests conducted at different temperatures. In the endurance tests, the vehicle in which the engine is installed was made to run over 80,000 km with the three-way catalyst held at predetermined different temperatures. In the FIGURE, the abscissa indicates the temperature at which the catalyst bed was held during the tests (° C.) and the ordinate the purification rates (%) of CO, HC, and NOx. The symbol "◯" represents a measuring point. The solid lines represent purification rates obtained when the air-fuel ratio is controlled to a stoichiometric air-fuel ratio ($=14.7$), and the chain lines purification rates obtained when the air-fuel ratio is controlled to a value ($=14.3$) richer than the stoichiometric air-fuel ratio.

As is clear from the FIGURE, certainly the purification rate of each of CO, HC, and NOx can be improved to some degree by controlling the air-fuel ratio to a richer value than a stoichiometric ratio. However, if the catalyst is continuously placed under a high temperature state where the catalyst bed temperature is 700° C. or higher, for a long time, the purification rates of CO and HC become lower as the temperature of the catalyst bed rises. That is, even if the catalyst bed temperature is 700° C.–800° C., the catalyst becomes deteriorated and hence its purification rates become lower after it has been long placed under such a high temperature state.

Therefore, the above proposed control system has the disadvantage that even if the air-fuel ratio is controlled to a richer value than a stoichiometric air-fuel ratio, the catalyst becomes deteriorated after being continuously placed under a normal engine operating condition in which the catalyst bed temperature is in a range from 700° C. to 800° C., for a long time, resulting in lower purification rates and hence degraded purifying ability.

Further, the proposed control system has another disadvantage that if the air-fuel ratio is controlled to a richer value than the stoichiometric air-fuel ratio, the CO component is emitted in an increased amount from the engine.

SUMMARY OF THE INVENTION

It is the object of the invention to provide a catalyst temperature control system for an internal combustion engine which is capable of preventing deterioration of the catalyst by lowering the catalyst bed temperature, to thereby restrain the exhaust emission purifying ability from becoming degraded with the lapse of time of use.

To attain the above object, the present invention provides a catalyst temperature control system for an internal combustion engine having an intake system an exhaust system, a catalyst having a catalyst bed and arranged in the exhaust system for purifying noxious components in exhaust gases emitted from the engine, and an exhaust gas recirculation passage connected to the intake system and the exhaust system for returning part of the exhaust gases from the exhaust system to the intake system.

The catalyst temperature control system according to the invention is characterized by an improvement comprising:

temperature detecting means for detecting a temperature of the catalyst bed of the catalyst;

exhaust gas recirculation amount-increasing means for increasing a recirculation amount of exhaust gases flowing through the exhaust gas recirculation passage, when the temperature of the catalyst bed detected by the temperature detecting means is higher than a first predetermined value; and air-fuel ratio enriching means for enriching the air-fuel ratio of a mixture supplied to the engine, when the temperature of the catalyst bed detected by the temperature detecting means is higher than a second predetermined value upon the lapse of a predetermined time period after the exhaust gas recirculation amount-increasing means started to increase the recirculation amount.

Preferably, the first predetermined value is higher than the second predetermined value.

Also preferably, the predetermined time period is a time period within which the air-fuel ratio of the mixture supplied to the engine and the temperature of the catalyst bed can become stable after emperature of the catalyst bed can become stable after the start of the increase of the recirculation amount by the exhaust gas recirculation amount-increasing means.

Further preferably, the catalyst temperature control system according to the invention may further include ignition timing correcting means for correcting ignition timing of the engine to an advanced side when and immediately after a second predetermined time period has elapsed after the exhaust gas recirculation amount-increasing means started to increase the recirculation amount.

Preferably the second predetermined time period is also set equal to the first-mentioned predetermined time period which corresponds to a time lag from the start of increase of the recirculation amount by the exhaust gas recirculation amount-increasing means to the time of occurrence of an increase in an amount of exhaust gases returned to the intake system.

Advantageously, the catalyst temperature control system according to the invention may further include fuel amount correcting means for decreasing an amount of fuel supplied to the engine when and immediately after a second predetermined time period has elapsed after the exhaust gas recirculation amount-increasing means started to increase the recirculation amount.

The above and other objects, features, and advantages of the invention will be more apparent from the following detailed description taken in conjunction, with the accompany drawings.

BRIEF DESCRIPTION OF THE DRAWINGS

FIG. 5 is a flowchart showing a manner of controlling exhaust gas recirculation amount-increasing means;

DETAILED DESCRIPTION

The invention will now be described in detail with reference to the drawings showing an embodiment thereof.

Figure 1:
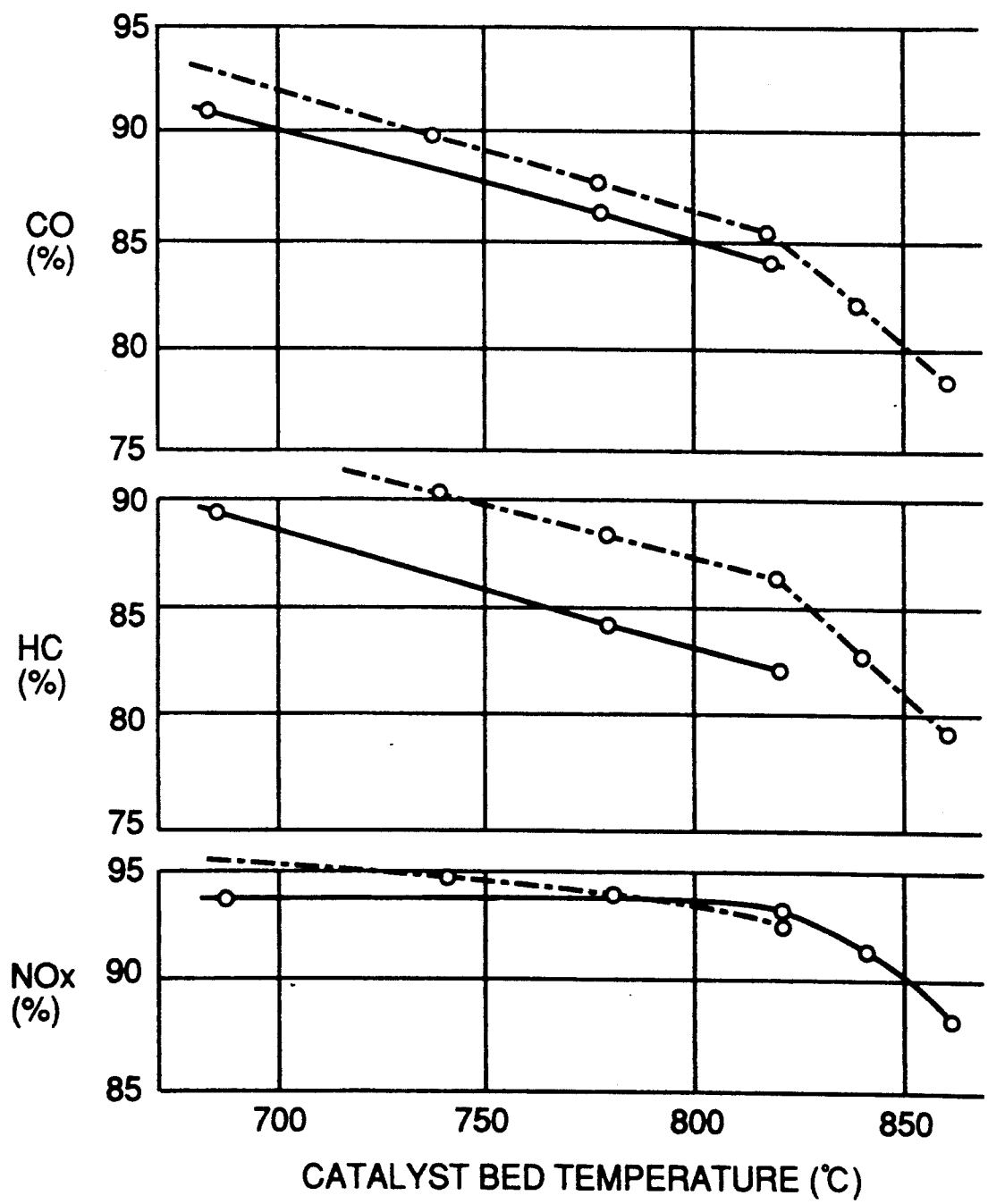
FIG. 1 is a graph showing deterioration characteristics of a three-way catalyst, i.e. the relationship between catalyst bed temperature, purification rates of CO, HC, and NOx, and the air-fuel ratio of the mixture.

Referring first to FIG. 1, there is shown the whole arrangement of a catalyst temperature control system for an internal combustion engine, according to an embodiment of the invention. In the FIGURE, reference numeral 1 designates an internal combustion engine (e.g. four-cylinder type) for automotive vehicles. Connected to the cylinder block of the engine 1 is an intake pipe (intake passage) 2 in which is arranged a throttle body 3 accommodating a throttle valve 3'. A throttle valve opening sensor (hereinafter referred to as "the $\theta_{TH}$ sensor) 4 is connected to the throttle valve 3' for generating an electric signal indicative of the sensed throttle valve opening and supplying same to an electronic control unit (hereinafter referred to as "the ECU") 5.

Fuel injection valves 6 are provided for respective engine cylinders and arranged in the intake pipe 2 each at a location between the throttle valve and the cylinder block of the engine 1 and slightly upstream of an intake valve, not shown. The fuel injection valves 6 are connected to a fuel pump, not shown, and electrically connected to the ECU 5 to have valve opening periods thereof controlled by signals therefrom.

On the other hand, an intake pipe absolute pressure ($P_{BA}$) sensor (hereinafter referred to as "the $P_{BA}$ sensor") 8 is provided in communication with the interior of the intake pipe 2 through a conduit 7 at a location downstream of the throttle valve 3' for supplying an electric signal indicative of the sensed absolute pressure within the intake pipe 2 to the ECU 5.

An intake air temperature (TA) sensor 9 is inserted into the intake pipe 2 at a location downstream of the conduit 7 and electrically connected to the ECU 5 for supplying an electric signal indicative of the sensed intake air temperature to the ECU 5.

An engine coolant temperature sensor (hereinafter referred to as "the TW sensor) 10, which may be formed of a thermistor or the like, is inserted into a jacket for coolant in the cylinder block of the engine and fixed thereto, for supplying an electric signal indicative of the sensed engine coolant temperature to the ECU 5.

An engine rotational speed sensor (hereinafter referred to as "the NE sensor") 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular engine cylinder, the pulses from the sensors 11, 12 being supplied to the ECU 5.

A spark plug 13 of each engine cylinder is electrically connected to the ECU 5 to have its spark timing controlled by an ignition signal therefrom.

A catalytic converter (three-way catalyst) 11 is arranged in an exhaust pipe (exhaust system) 10 connected to an exhaust port of the engine 1, for purifying noxious components such as HC, CO, and NOx in exhaust gases limited from the engine.

A catalyst temperature (TC) sensor 16 is inserted into the wall of the catalytic converter 15 to sense the temperature of the catalyst bed and supply an electric signal indicative of the sensed catalyst bed temperature TC to the ECU 5.

An oxygen concentration sensor (hereinafter referred to as "the O$_2$ sensor) 17 is mounted in the exhaust pipe 14 at a location upstream of the catalytic converter 15, for sensing the concentration of oxygen present in exhaust gases emitted from the engine and supplying an electric signal indicative of the sensed oxygen concentration to the ECU 5.

An exhaust gas recirculation passage 18 is arranged between the intake pipe 2 and the exhaust pipe 14 such that it bypasses the engine 1. The exhaust gas recirculation passage 18 has one end thereof connected to the interior of the exhaust pipe 14 at a location upstream of the O$_2$ sensor 17 (i.e. on the engine side of same), and the other end thereof connected to the interior of the intake pipe 2 at a location upstream of the PBA sensor 8 (i.e. on the throttle valve side of same).

Figure 2:
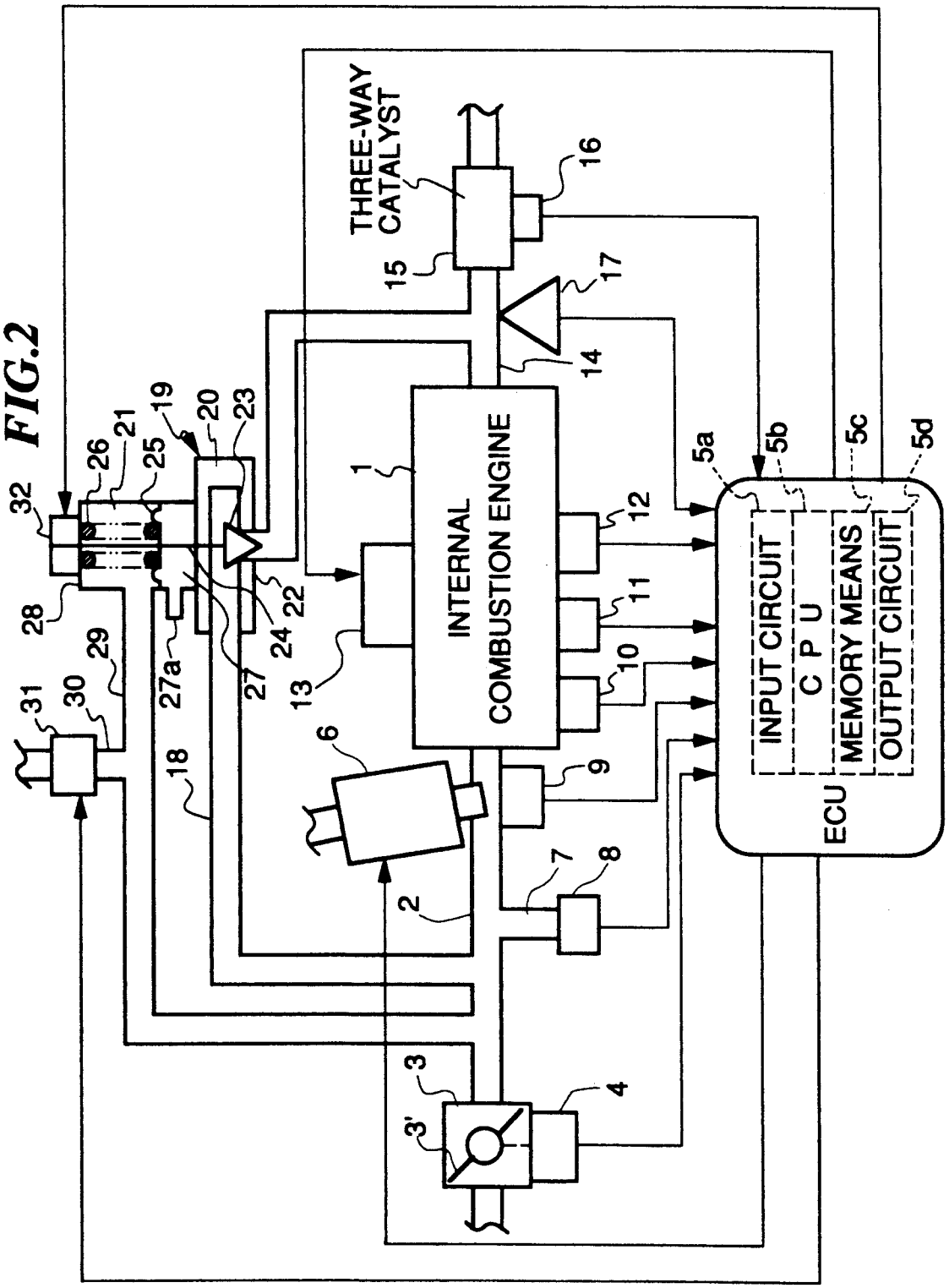
FIG. 2 is a schematic block diagram showing the whole arrangement of a catalyst temperature control system for an internal combustion engine, according to an embodiment of the invention.

An exhaust gas recirculation control valve (hereinafter referred to as "the EGR valve") 19 is arranged across an intermediate portion of the exhaust gas recirculation passage 18. The EGR valve 19 is formed of a so-called diaphragm valve of the differential pressure-responsive type. The EGR valve comprises a casing 22 having a valve chamber 20 and a diaphragm chamber 21 defined therein, a valve body 23 arranged within the valve chamber 20 of the casing 22 for movement to close and open the exhaust gas recirculation passage 18, a diaphragm (member responsive to differential pressure) 25 connected to the valve body 23 via a valve stem 24, and a spring 26 urging the diaphragm 25 in a valve-closing direction. The diaphragm chamber 21 is divided into an atomospheric pressure chamber 27 defined by the diaphragm 25 on a lower side thereof as viewed in FIG. 2, and a negative pressure chamber 22 defined by the diaphragm 20 on an upper side thereof. The atmospheric pressure chamber 27 is communicated with the atmosphere via a hole 27a, and the negative pressure chamber 28 with a negative pressure communication passage 29. More specifically, the negative pressure communication passage 29 has one end thereof connected to the interior of the intake pipe 2 at a location between the throttle valve 3' and the other end of the exhaust gas recirculation passage 18, whereby the pressure P$_{BA}$ within the intake pipe 2 is supplied to the negative pressure chamber 18 via the negative pressure communication passage 29. An atmosphere communication passage 30 is connected to an intermediate portion of the negative pressure communication passage 29, and a resultant pressure control valve 31 is arranged across the atmosphere communication passage 30. The operation of the resultant pressure control valve 31, which is formed of a normally-open electromagnetic valve, is controlled by the duty ratio of a command signal from the ECU 5 to thereby control the resultant pressure introduced into the negative pressure chamber 28 of the diaphragm chamber 21. If the resultant pressure control valve 31 is energized to be closed, the negative pressure within the negative pressure chamber 28 increases, i.e. the force biasing the diaphragm 25 in a valve-opening direction (i.e. upward) increases, so that the diaphragm 25 moves upward against the urging force of the spring 26 to thereby increase the valve opening (lift) defined by the valve body 23 of the EGR valve 19. On the other hand, if the control valve 31 is deenergized to be opened, the negative pressure within the negative pressure chamber 28 decreases, i.e. the force biasing the diaphragm 25 in the valve-opening direction decreases, so that the diaphragm 25 moves downward by the urging force of the spring 26 to thereby displace the valve body 23 of the EGR valve 19 to a lower position to decrease the valve opening defined by the valve body 23. In this way, the valve opening of the EGR valve 19 can be controlled by energizing or deenergizing the resultant pressure control valve 31. The resultant pressure control valve 31 is electrically connected to the ECU 5, to be controlled to close or open by the command signal from the ECU 5, whereby the lift or lifting speed of the valve body 23 of the EGR valve 19 is controlled.

A valve opening (lift) sensor (hereinafter referred to as "the L sensor") 32 is provided for the EGR valve 19, which detects the operating position (lift) of the valve body 23 of the EGR valve 19 and supplies a signal indicative of the detected lift of the valve body 23.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed by the CPU 5b, maps, etc. and for storing results of calculations therefrom, etc., and an output circuit 5d which supplies driving signals to the fuel injection valves 6, the spark plugs 13, the resultant pressure control valve 31, etc.

The CPU 5 operates in response to the above-mentioned engine operating parameter signals from the sensors to determine operating conditions in which the engine 1 is operating, such as an air-fuel ratio feedback control region in which the fuel supply is controlled in response to the detected oxygen concentration in the exhaust gases, and open-loop control regions, and calculates, based upon the determined operating conditions, the valve opening period or fuel injection period TOUT over which the fuel injection valves 6 are to be opened, by the use of the following equation (1) in synchronism with inputting of TDC signal pulses to the ECU 5:

$$TOUT = Ti \times K1 \times KEGR \times KO2 + K2 \tag{1}$$

where Ti represents a basic value of the fuel injection period TOUT of the fuel injection valves 6, which is read from a Ti map stored in the memory means 5c and set in accordance with the engine rotational speed Ne and the intake pipe absolute pressure PBA.

KEGR represents a fuel amount correction coefficient for correcting an amount of fuel supplied to the engine in response to an amount of exhaust gas recirculated through the exhaust recirculation passage 18, so as to bring the air-fuel ratio of the mixture to a stoichiometric air-fuel ratio as hereinafter described.

KO$_2$ represents an air-fuel ratio feedback correction coefficient whose value is determined in response to the oxygen concentration in the exhaust gases detected by the O₂ sensor 17, during air-fuel ratio feedback control, while it is set to respective predetermined appropriate values while the engine is in predetermined operating regions (the open-loop control regions) other than the feedback control region.

K1 and K2 represent other correction coefficients and correction variables, respectively, which are calculated based on various engine operating parameter signals to such values as to optimize characteristics of the engine such as fuel consumption and accelerability depending on operating conditions of the engine.

Further, the ECU 5 calculates an ignition timing value by the use of the following equation (2) to effect advancing and retarding control and the ignition timing:

$$\theta IG = \theta IGMAP + \theta IGCAT \tag{2}$$

where θIGMAP represents a basic ignition timing value which is set in response to operating conditions, e.g. engine rotational speed NE and intake pipe absolute pressure PBA by the use of an NE-PBA-θIG map stored in the memory means (ROM) 5c. θIGCA represents an ignition timing correction value which can be read from a correction value map for use in controlling the catalyst bed temperature, stored in the memory means 5c.

So far as the catalyst temperature control system is concerned, the ECU 5 forms exhaust gas recirculation amount-increasing means which increases a recirculation amount of exhaust gases flowing through the exhaust gas recirculation passage 18 when the catalyst bed temperature TC sensed by the TC sensor 16 exceeds a first predetermined temperature TX1, ignition timing correcting means which corrects the ignition timing to a value on an advanced side when and immediately after a predetermmined time period (delaying time period) T1 has elapsed after the exhaust gas recirculation amount-increasing means started to increase the recirculation amount, and air-fuel ratio enriching means which enriches the air-fuel ratio of a mixture supplied to engine when the catalyst bed temperature TC is below the first predetermined value TX1 but exceeds a second predetermined value TX2 at the time a second predetermined time period T2 has elapsed after the start of increase of the recirculation amount by the exhaust gas recirculation amount-increasing means.

Besides, the ECU 5 also forms fuel amount correcting means which corrects the amount of fuel supplied to the engine immediately after the lapse of the first predetermined time period T1.

Figure 3:
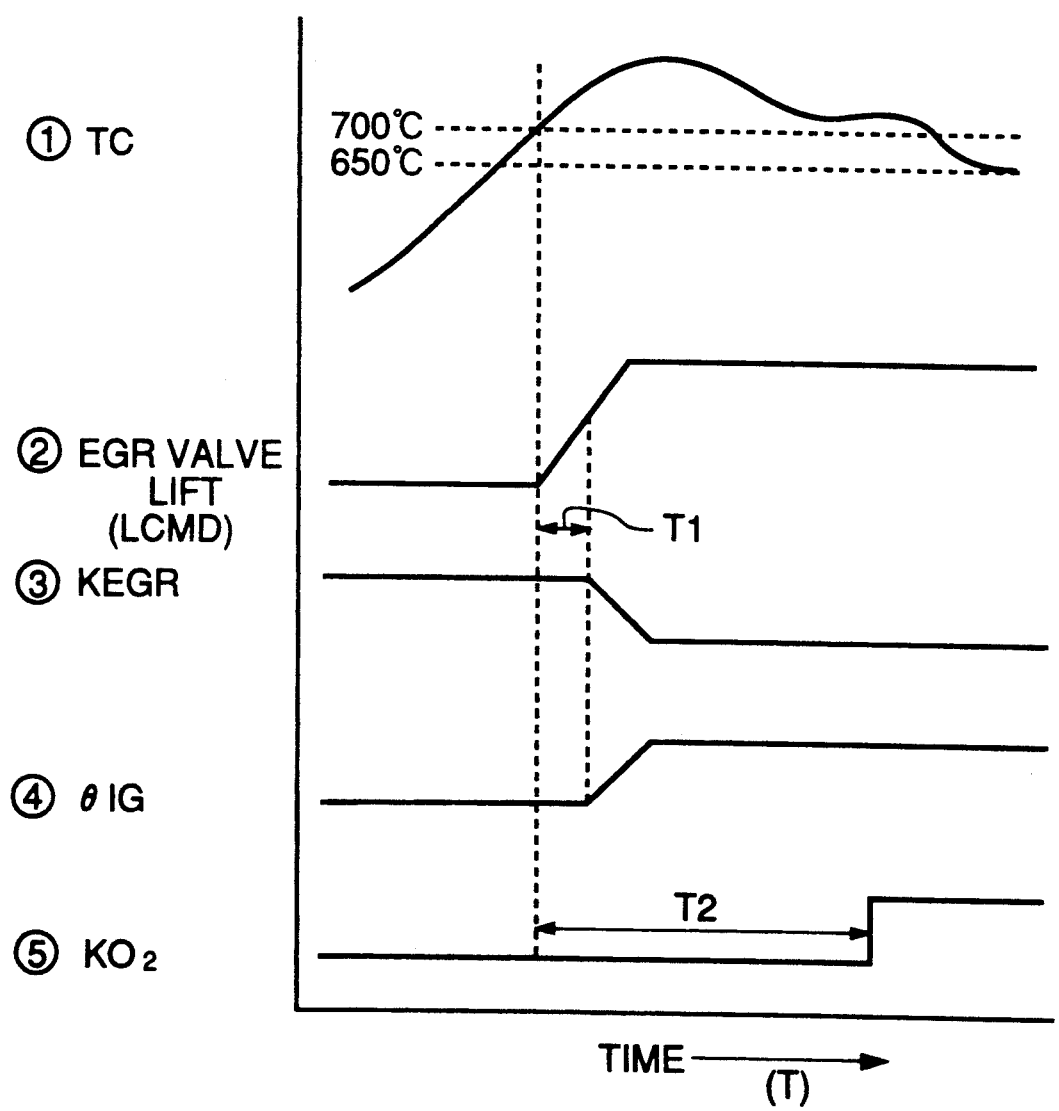
FIG. 3 is a timing chart showing the relationship in timing between operations of various means incorporated in an electronic control unit (ECU) in FIG. 2.

FIG. 3 shows the relationship in operating timing between the above various means of the ECU 5. As shown in the FIGURE, the ECU 5 operates as follows:

(i) The ECU 5 reads a value of the catalyst bed temperature TC from the TC sensor 16;

(ii) If the read value of the catalyst bed temperature TC exceeds the first predetermined value TX1, e.g. 700° C., above which the catalyst can deteriorate, the exhaust gas recirculation amount-increasing means increases a desired valve opening value LCM for the EGR valve 19 to increase the exhaust gas recirculation amount (the amount of unburnt gas) and hence lower the catalyst bed temperature TC;

(iii) When the first predetermined time period T1 has elapsed, which corresponds to the time lag from the time of lifting of the EGR valve 19 to the time of the resulting increase in the amount of exhaust gases returned to the intake pipe, the fuel amount correcting means calculates the fuel amount correction coefficient KEGR to correct the fuel injection period TOUT in order to correct the air-fuel ratio to a stoichiometric air-fuel ratio according to the increase in the recirculation amount;

(iv) Simultaneously with the operation of the fuel amount correcting means, the ignition timing correcting means operates to correct the ignition timing θIG to a value on the advanced side and hence lower the combustion temperature:

(v) When the second predetermined time period T2 has elapsed, which is set to a time period within which the air-fuel ratio A/F and the catalyst bed temperature become stable, if then the catalyst bed temperature TC then exceeds the second predetermined value TX2, the air-fuel ratio enriching means operates to increase the air-fuel ratio to a value on a richer side, e.g. an air-fuel ratio of 14.3. The second predetermined temperature TX2 is set at a value above which the purification rates of the catalyst can increase if the air-fuel ratio is thus enriched, e.g. 650° C., with the FIG. 1 deterioration characteristics taken into account.

Details of the above operations (i)-(v) will now be explained:

(i) Reading of the catalyst bed temperature TC

Figure 4:
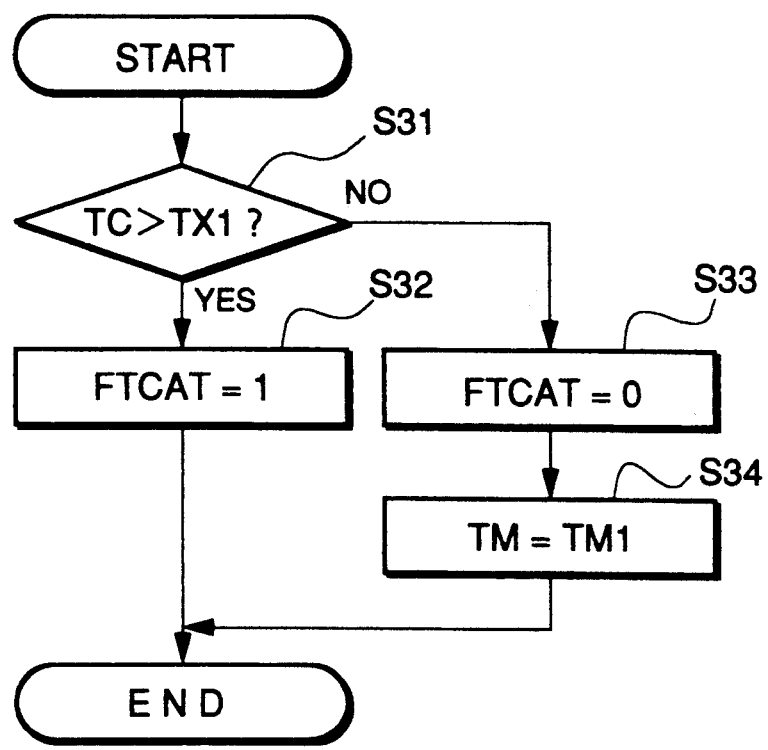
FIG. 4 is a flowchart showing a manner of reading the catalyst bed temperature.

FIG. 4 shows a program for reading the catalyst bed temperature TC and determining whether or not control of the catalyst temperature should be effected depending upon the read catalyst bed temperature TC. This programs is executed at constant time intervals, e.g. 80msec.

First, it is determined at a step S31 whether or not the read value of the catalyst bed temperature TC is higher than the first predetermined value TXI (e.g. 700° C). If the answer is affirmative (Yes), a flag FTCAT is set to 1 at a step S32 to indicate that the catalyst temperature control should be effected, followed by terminating the program. If the answer to the step S31 is negative (No), it is presumed that the degree of deterioration of the catalyst due to its bed temperature will be ignorably small, and then the flag FTCAT is set to 0 to inhibit the catalyst temperature control, at a step S33. Then, at a step S34, a timer TM for use in control of the KO₂ value, hereinafter described, is set to a predetermined time period TM1 corresponding to the predetermined time period T2 in FIG. 3, followed by terminating the program.

(ii) Control of the exhaust gas recirculation amount

FIG. 5 shows a program for controlling the exhaust gas recirculation amount, which is executed at constant time intervals, e.g 40msec.

First, it is determined at a step S41 whether or not a flag FEGR has been set to 1, to determine whether or not the EGR valve 19 is open. Whether or not the EGR valve 19 is to be opened, i.e. the flag FEGR is to be set to 1, is determined in dependence on operating parameters of the engine such as throttle valve opening θTH and engine coolant temperature TW by an EGR control subroutine, not shown. When the flag FEGR assumes 0, it is assumed that the EGR valve 19 is then inoperative, and then a valve opening correction coefficient KLMD is set to 0 at a step S42, followed by terminating the program.

On the other hand, when the flag FEGR has been set to 1, it is determined at a step S43 whether or not the engine rotational speed NE is lower than a predetermined value NX (e.g. 2000 rpm). If the answer is affirmative (Yes), it is assumed that the exhaust gas temperature is so low that the catalyst temperature control need not be effected, and then the valve opening correction coefficient KLCMD is set to 0, followed by terminating the program.

When the engine rotational speed NE is determined to be higher than the predetermined value NX at the step S43, it is determined at a step S44 whether or not the flag FTCAT set at the step S32 in FIG. 4 assumes 1. If the flag FTCAT assumes 1, i.e., if the catalyst bed temperature TC is higher than the first predetermined value TX1, a correction values ΔKL is added to the correction coefficient KLCMD value obtained in the last loop to obtain a new value of the KLCMD value, at a step S45, and the new KLCMD value is stored into the memory means 5c.

Then, a limit checking of the KLCMD value is effected at a step S46. Specifically, it is determined whether or not the KLCMD value exceeds a predetermined upper limit KLCMDLMT. If the KLCMD value is smaller than the predetermined upper limit KLCMDLMT, the program proceeds to a step S51, whereas when afterwards the KLCMD value exceeds the upper limit KLCMDLMT, the correction coefficient KLCMD is set to the upper limit KLCMDLMT, followed by the program proceeding to the step S51.

On the other hand, at the step S44, if it is determined that the flag FTCAT assumes 0, i.e., if the catalyst bed temperature TC is lower than the first predetermined value TX1, the correction value ΔKL is subtracted from the KLCMD value obtained in the last loop to obtain a new value of the KLCMD value and the new KLCMD value is stored into the memory means 5c at a step S48. It is then determined at a step S49 whether or not the correction coefficient KLCMD is smaller than 0. If the answer is negative (No), the program proceeds to the step S51, whereas if the answer is affirmative (Yes), the correction coefficient KLCMD is set to 0, followed by the program proceeding to the step S51. In the step S51, the desired valve opening value LCMD is multiplied by the valve opening correction coefficient KLCMD obtained at the step S45, S48, S47 or S50, to obtain a new value of the valve opening value LCMD, followed by terminating the program.

The desired valve opening value LCMD thus obtained is compared with the actual valve opening value LACT of the EGR valve 19 sensed by the L sensor 32, and responsive to the comparison result, the pressure control valve 31 operates to control the lift (valve opening) of the EGR valve 19 such that the absolute value of the difference between the desired valve opening value LCMD and the actual one LACT becomes zero. In this way, when the catalyst bed temperature TC is higher than the first predetermined value TX1, the desired valve opening value LCMD is set to a larger value by means of the valve opening correction coefficient KLCMD to increase the exhaust gas recirculation amount, whereby the exhaust gas temperature and hence the catalyst bed temperature TC can be lowered.

(iii) Calculation of the fuel amount correction coefficient KEGR

The fuel amount correction coefficient KEGR is calculated by a calculation program which is started to be executed upon the lapse of the predetermined time period T1 after the start of increase of the exhaust gas recirculation amount. Specifically, a counter is previously set to a count value CT1 which corresponds to the predetermined time period T1. When the count value CT of the counter has become zero, execution of the present calculation program is started.

Figure 6:
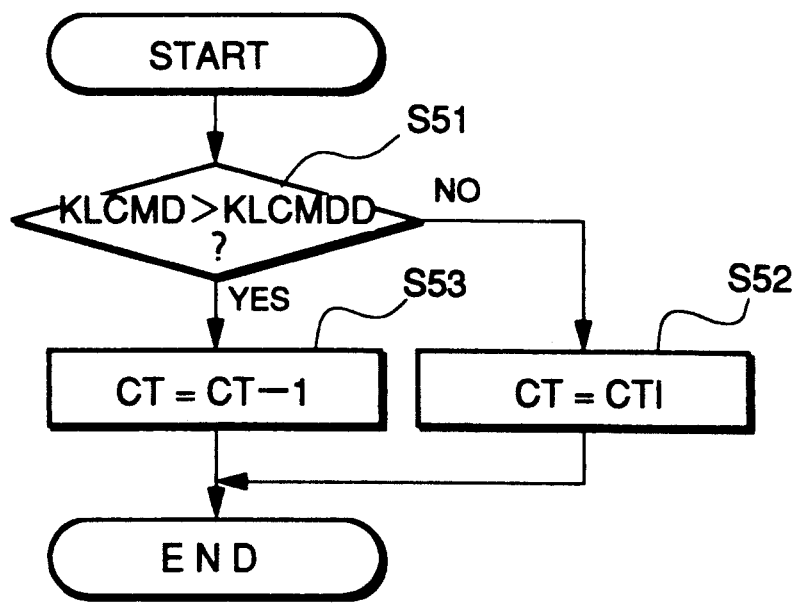
FIG. 6 is a flowchart showing a manner of setting a counter in the catalyst temperature control system.

FIG. 6 shows a program for setting the count value CT of the counter. First, it is determined at a step S51 whether or not the valve opening correction coefficient KLCMD is larger than a predetermined lower limit KLCMDD above which control of the catalyst bed temperature should be effected. If the former is smaller than the latter, it is assumed that the catalyst bed temperature control need not be effected, and then the count value CT of the counter is set to the predetermined value CT1 at a step S52, followed by terminating the program. On the other hand, if the valve opening correction coefficient KLCMD is higher than the predetermined lower limit KLCMDD, the count value CT is decremented by 1 at a step S53.

Figure 7:
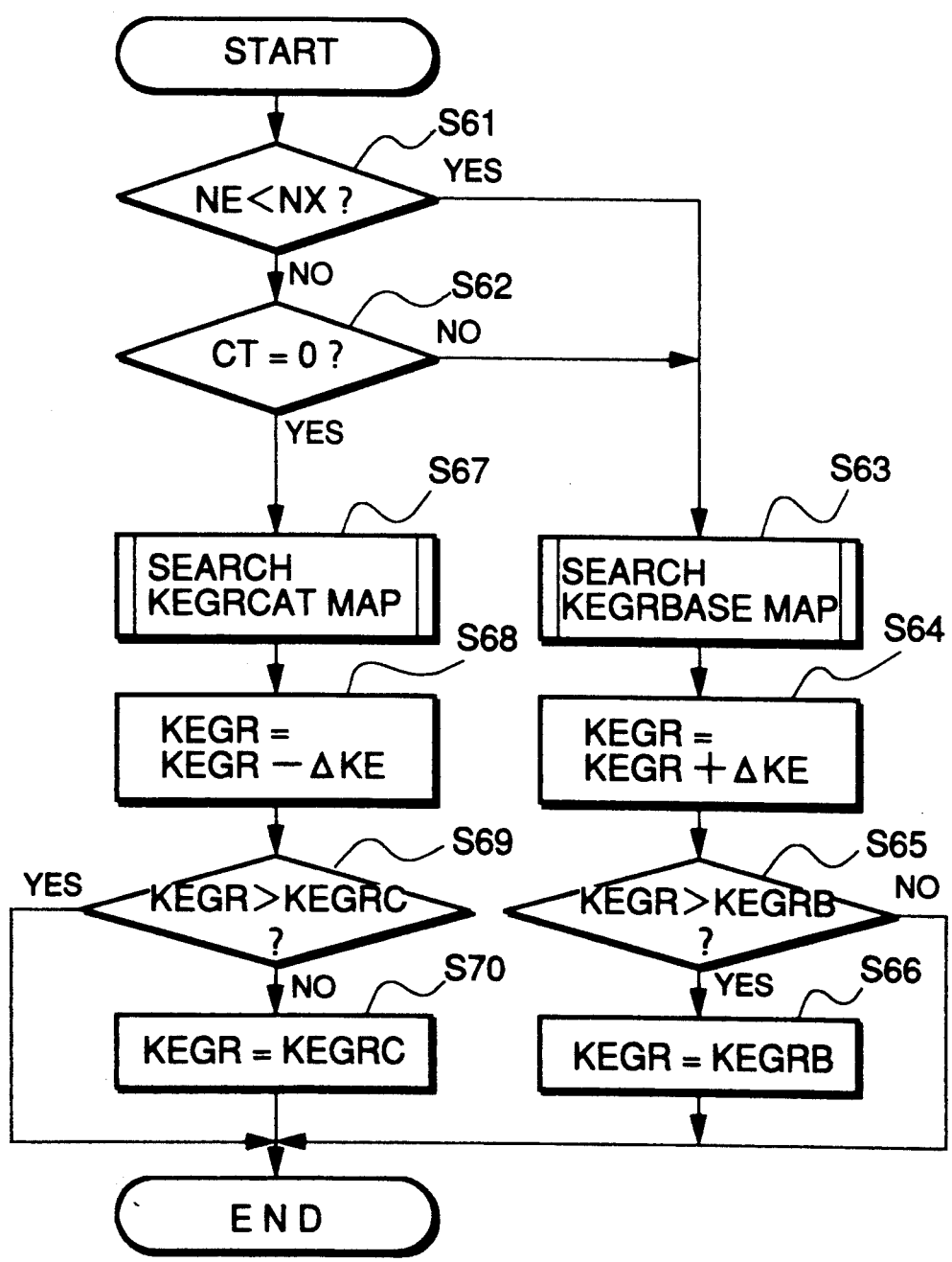
FIG. 7 is a flowchart showing a manner of controlling fuel amount correcting means.

FIG. 7 shows a program for calculating the fuel amount correction coefficient KEGR.

First, similarly to the step S43 in FIG. 5, it is determined at a step S61 whether or not the engine rotational speed NE is lower than the predetermined value NX (e.g. 2000rpm). If the engine rotational speed NE is lower than the predetermined value NX, it is assumed that the catalyst temperature control need not be effected, and then the program proceeds to a step S63. On the other hand, if the engine rotational speed NE exceeds the predetermined value NX, it is determined at a step S62 whether or not the count value CT of the counter has been decremented to 0. In the first loop of execution of the present program, the count value CT is not equal to 0, and therefore, a KEGRBASE map, which is used when the catalyst temperature control need not be effected, is selected to read a value of a correction coefficient KEGRB, and the read correction coefficient value is stored into the memory means 5c at a step S63. The KEGRBASE map is set in accordance with the engine rotational speed NE and the intake pipe absolute pressure PBA and stored in the memory means 5c.

Next, a predetermined correction value ΔKE is added to the present value of the fuel amount correction coefficient KEGR and the corrected or new KEGR value is stored into the memory means 5c at a step S64. It is then determined at a step S65 whether or not the stored KEGR value is larger than the KEGRB value read at the step S63. If the former is smaller than the latter, the program is immediately terminated, whereas if the former is larger than the latter, the read KEGRB is adopted as the fuel amount correction coefficient KEGR value at the step S66, followed by terminating the program.

On the other hand, if afterwards the count value CT becomes 0. a value of a predetermined correction coefficient KEGRC is read from a KEGRCAT map for use in the catalyst temperature control, and the read KEGRC value is stored into the memory means 5c at a step S67. Also this KEGRCAT map is set in accordance with engine operating parameters, e.g. the engine rotational speed NE and the intake pipe absolute pressure PBA, like the aforesaid KEGRBASE map. Then, the predetermined correction value ΔKE is subtracted from the KEGR value obtained in the last loop and the corrected or new KEGR value is stored into the memory means 5c at a step S68. It is then determined at a step S69 whether or not the stored KEGR value is larger than the value of the correction coefficient KEGRC read at the step S67. If the former is larger than the latter, the program is immediately terminated, whereas if the former is smaller than the latter, the value of the correction coefficient KEGRC is adopted as the fuel amount correction coefficient KEGR at a step S70, followed by terminating the program. In this way, the fuel amount correction coefficient KEGR progressively decreases after the lapse of the delay time period T1 after the start of increase of the exhaust gas recirculation amount. Consequently, the fuel injection period TOUT is progressively decreased by the correction coefficient KEGR (see the equation (1)). Therefore, even when the exhaust gas recirculation amount (unburnt gas amount) increases, the fuel injection amount decreases so that the air-fuel ratio can be controlled to the stoiohiometric air-fuel ratio.

(iv) Ignition timing control

Figure 8:
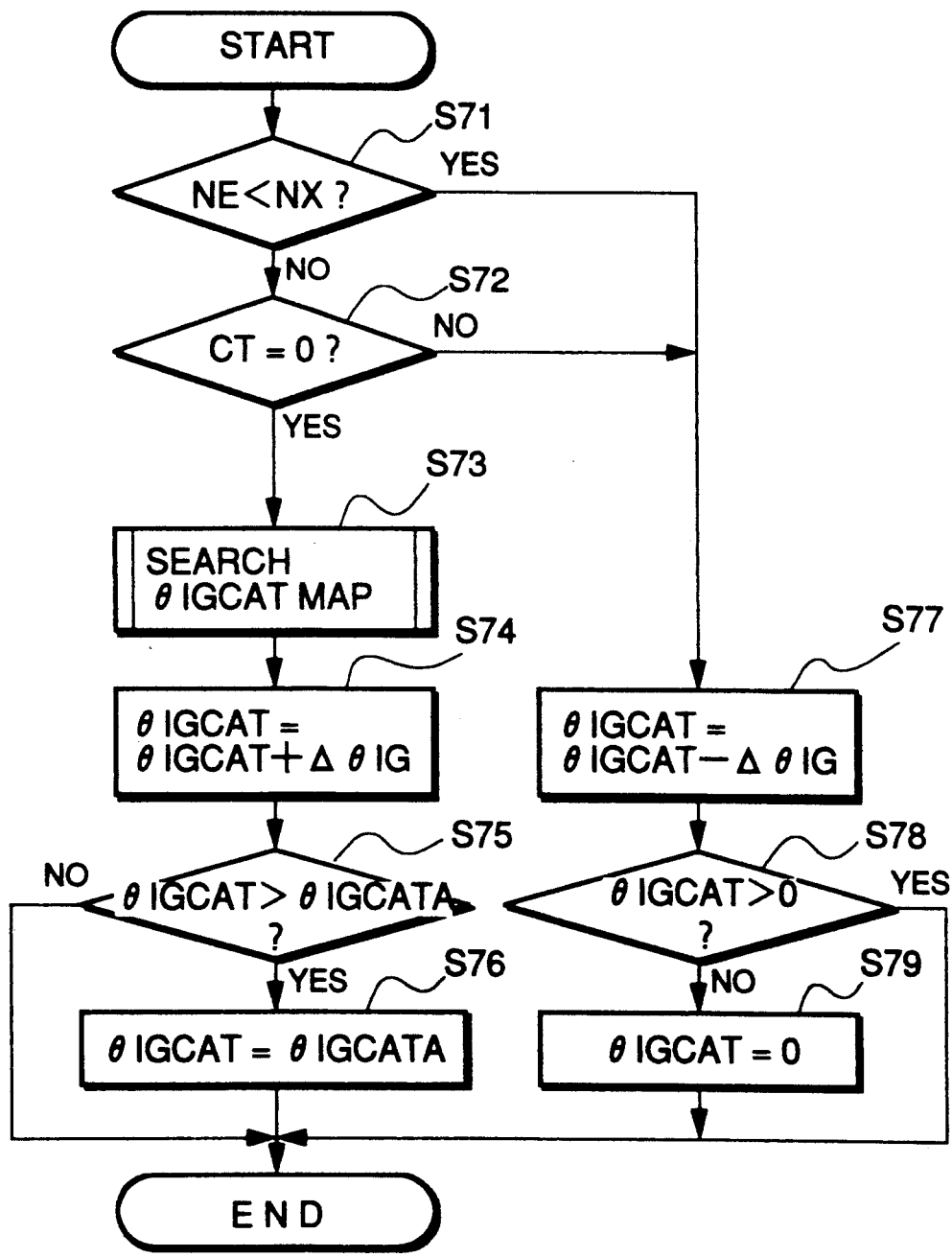
FIG. 8 is a flowchart showing a manner of controlling ignition timing correcting means.

The ignition timing control is carried out in a manner shown in FIG. 8.

First, it is determined at a step S71 whether or not the enging rotational speed NE is higher than the predetermined value NX (e.g. 2000rpm). If the answer is affirmative (Yes), it is assumed that the catalyst temperature control need not be effected, and then the program proceeds to a step S77, whereas if the answer is negative (No), the program proceeds to a step S72 where it is determined whether or not the count value CT of the counter is equal to 0. In the first loop of execution of the present program, the count value CT is not equal to 0, and then the program proceeds to the step S77. In the step S77, a predetermined correction value $\Delta\theta IG$ is subtracted from a value of the ignition timing correction value $\theta IGCAT$ obtained in the last loop to obtain a new value of the ignition timing value $\theta IGCAT$, which is stored into the memory means 5c. Then, it is determined at a step S78 whether or not the stored new ignition timing value $\theta IGCAT$ is larger than 0. If the answer is affirmative (Yes), the program is immediately terminated, whereas if the answer is negative (No) the ignition timing value $\theta IGCAT$ is set to 0 at a step S79, followed by terminating the program.

When afterwards the count value CT becomes equal to 0, a correction value $\theta IGCATA$ is read from a $\theta IGCAT$ map and stored into the memory means 5c at a step S73 Then, the correction value $\Delta\theta IG$ is added to the ignition timing correction value $\theta IGCAT$ to obtain a new or corrected $\theta IGCAT$ value, which is stored into the memory means 5c at a step S74. It is then determined at a step S75 whether or not the stored $\theta IGCAT$ value is larger than the correction value $\theta IGCATA$ read at the step S73. If the answer is negative (No), the program is immediately terminated, whereas if the answer is affirmative (Yes), the $\theta IGCATA$ value is adopted as the ignition timing correction value $\theta IGCAT$ at a step S76, followed by terminating the program.

The ignition timing correction value $\theta IGCAT$ thus calculated is applied to the aforesaid equation (2) so that the ignition timing is progressively corrected toward an advanced side after the lapse of the predetermined delay time T1 after the start of the catalyst temperature control, whereby the combustion temperature and hence the catalyst bed temperature can be lowered.

(v) Air-fuel ratio control

Figure 9A:
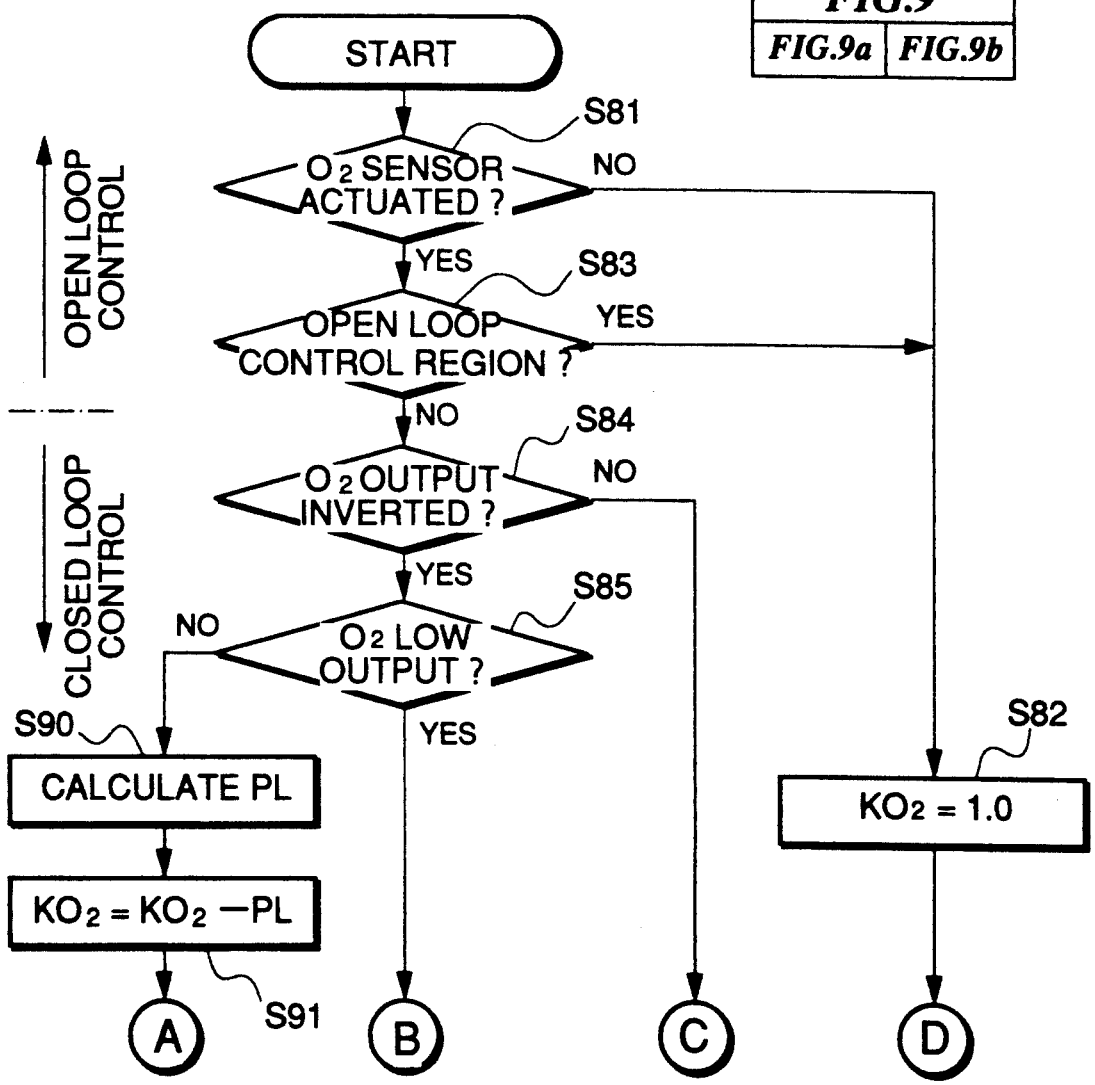
FIG. 9 is a flowchart showing a manner of controlling air-fuel ratio enriching means.
Figure 9B:
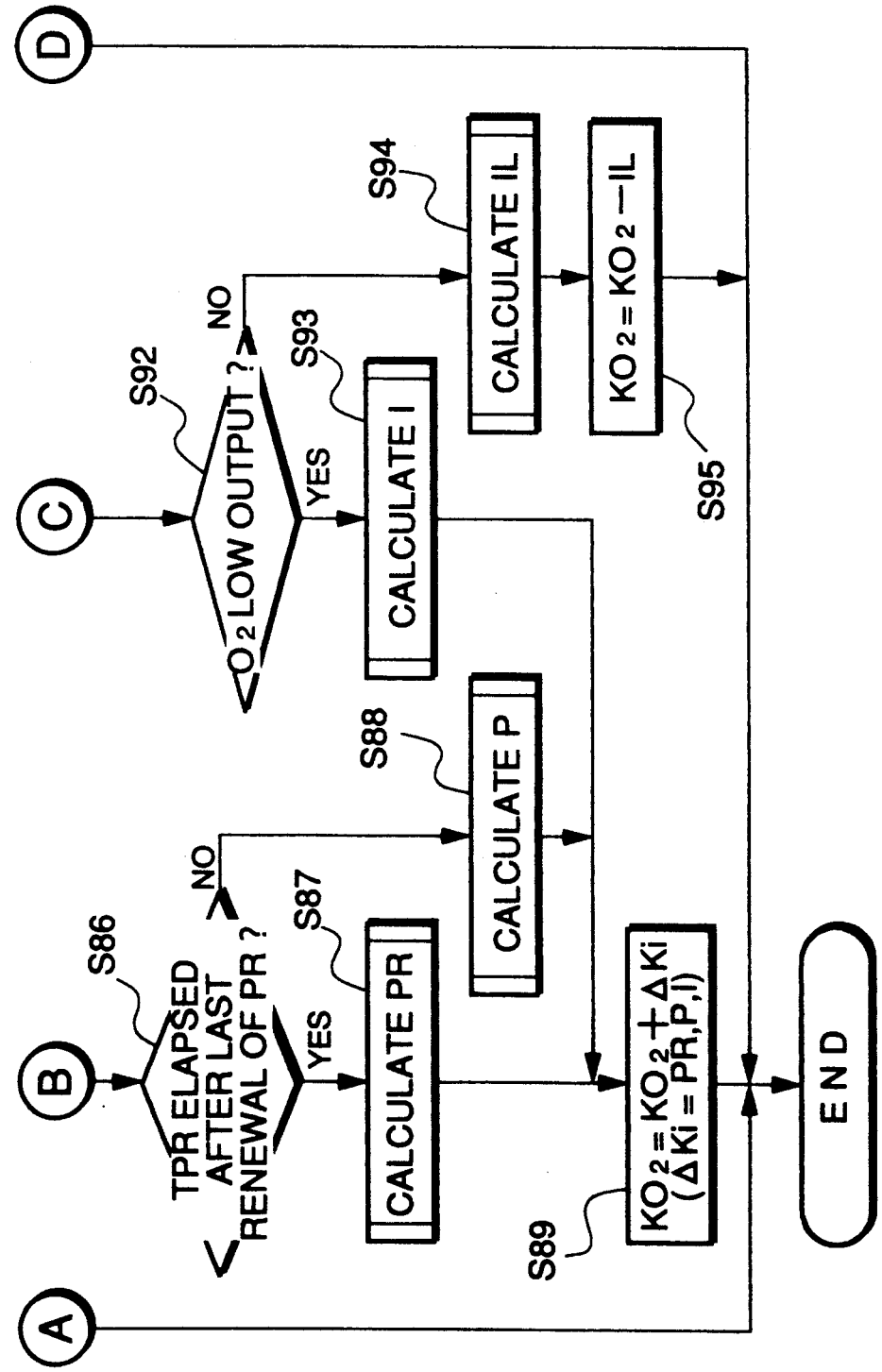

FIG. 9 shows a program for calculating the air-fuel ratio correction coefficient $KO_2$. This program is executed upon generation of each TDC pulse and in synchronism therewith.

First, it is determined at a step S81 whether or not activation of the $O_2$ sensor 17 has been completed. The $O_2$ sensor activation may be determined by monitoring a change in the internal resistance of the $O_2$ sensor 17 such that when the output voltage of the $O_2$ sensor 17 has dropped to or below a predetermined activation value Vx (e.g. 0.6 volts), the $O_2$ sensor is determined to have been activated. If the answer is negative (No), the air-fuel ratio correction coefficient $KO_2$ is set to 1.0 at a step S82, followed by terminating the program, whereby open loop control of the air-fuel ratio is carried out according to the aforesaid equation (1) wherein the other correction coefficients K1 are set to respective values appropriate to the operating condition under which the engine is operating. If the answer to the step S81 is affirmative (Yes), it is determined at a step S83 whether or not the engine is operating in an open loop control region. If the answer is affirmative (Yes), the correction coefficient $KO_2$ is set to 1.0 at the step S82, followed by terminating the program, whereby air-fuel ratio open loop control is carried out in a similar manner to that mentioned above.

On the other hand, if the answer to the step S83 is negative (No), it is assumed that the engine is operating in an air-fuel ratio feedback control region, and then the air-fuel ratio is feedback-controlled in response to the output from the $O_2$ sensor 17. Specifically, it is determined at a step S84 whether or not the output level of the $O_2$ sensor 17 has been inverted. If the output level has been inverted, proportional control (P term control) is carried out, while so long as the output level remains uninverted, integral control (I term control) is carried out.

In the proportional control, it is determined at a step S85 whether or not the output of the $O_2$ sensor 17 is at a low or lean-side level after being inverted. If the answer is affirmative (Yes), it is determined at a step S86 whether or not a predetermined time period TPR has elapsed after the last occasion of application of a correction value PR, hereinafter referred to. This predetermined time period TPR is provided to maintain the period of application of the correction value PR constant over the entire engine rotational speed range. Therefore, the predetermined time period TPR is set to smaller values as the engine rotational speed NE increases. If the answer to the step S86 is affirmative (Yes), a PR calculation subroutine, hereinafter described, is executed to calculate the correction value PR at a step S87, whereas if the answer to the step S86 is negative (No), a P calculation subroutine, hereinafter described, is executed to calculate a correction value P at a step S88. The correction value PR or P is added to a value of the correction coefficient $KO_2$ obtained in the last loop to obtain a new value of the correction coefficient $KO_2$ at a step S89, followed by terminating the program. On the other hand, if the answer to the step S85 is negative (No), i.e. if the output of the $O_2$ sensor 17 is at a high or rich-side level, a correction value PL is calculated at a step S90 followed by subtracting the calculated PL value from the $KO_2$ value obtained in the last loop to obtain a new $KO_2$ value at a step S91, followed by terminating the program.

In this way, when the output level of the $O_2$ sensor 17 has been inverted such that the inverted output voltage $VO_2$ is higher than a predetermined reference value VREF, it is determined that the air-fuel ratio has changed from a lean state to a rich state, and then the correction value PL dependent upon the engine rotational speed is subtracted from the $KO_2$ value to thereby control the air-fuel ratio to a leaner value.

In the integral control which is executed when the answer to the step S84 is negative (No), it is determined at a step S92 whether or not the output level of the $O_2$ sensor is low, similarly to the step S85. If the answer is affirmative (Yes), an I control subroutine, hereinafter described, is executed to calculate a correction value I at a step S93, and then the calculated correction value I is added to the $KO_2$ value obtained in the last loop to calculate a new value of the correction value $KO_2$ at a step S89, followed by terminating the program. On the other hand, if the answer to the step S92 is negative (No), a correction value IL is calculated at a step S94, and then the calculated IL value is subtracted from the $KO_2$ value obtained in the last loop to calculate a new value of the correction coefficient $KO_2$ at a step S94, followed by terminating the program. In this way, so long as the output voltage $VO_2$ from the $O_2$ sensor 17 remains above the predetermined reference voltage VREF, i.e. so long as the air-fuel ratio remains in a rich state, the correction coefficient $KO_2$ is decreased by the correction value IL so that the air-fuel ratio is controlled to a leaner value.

Figure 10:
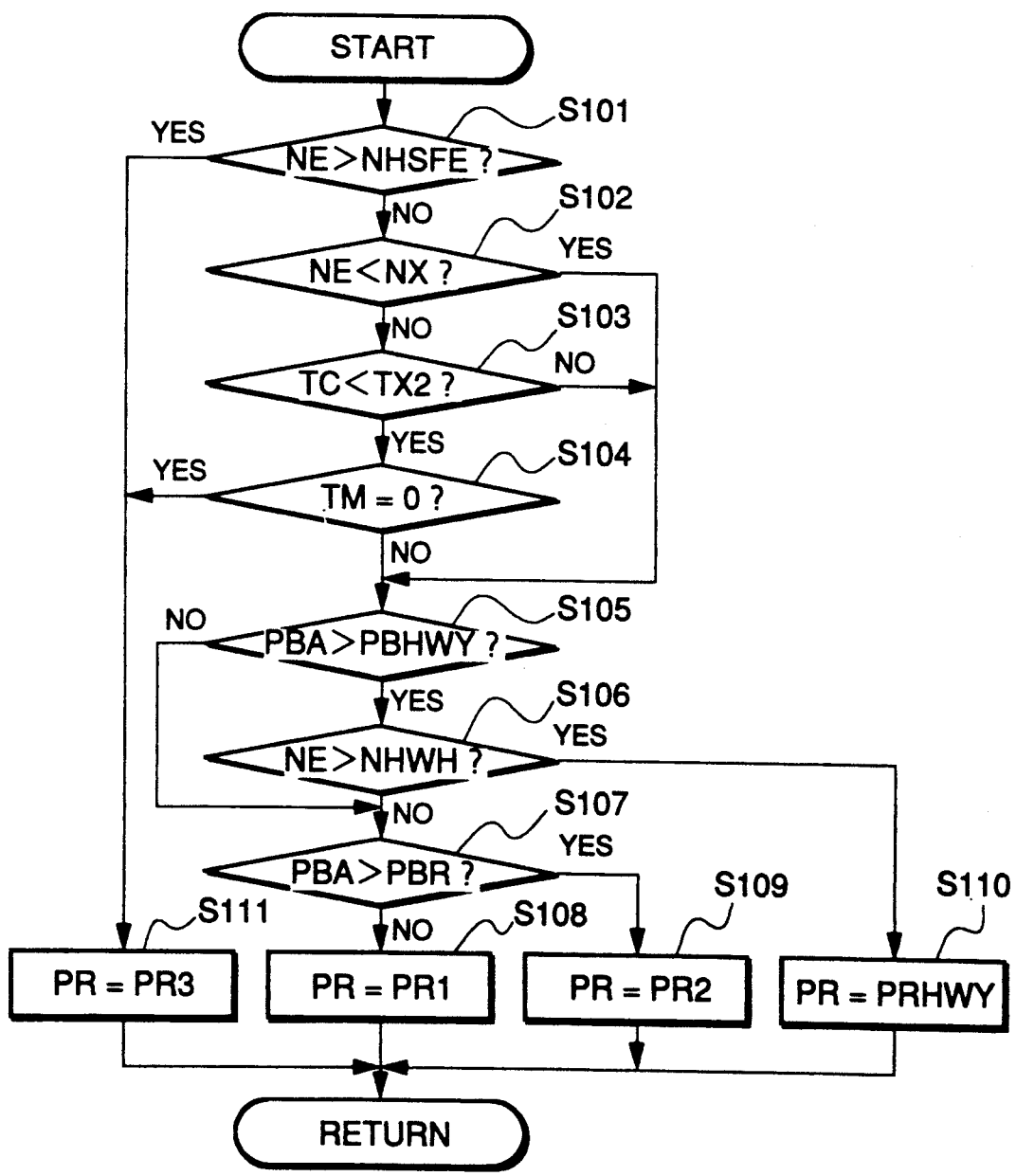
FIG. 10 is a flowchart showing a subroutine for calculating a correction value PR by the air-fuel ratio enriching means.

FIG. 10 shows the PR calculation subroutine which is executed at the step S87 in FIG. 9.

First, it is determined at a step S101 whether or not the engine rotational speed NE is higher than a predetermined value NHSFE (e.g. 3900rpm). If the answer is negative (No), it is further determined at a step S102 whether or not the engine rotational speed NE is lower than the predetermined value NX (e.g. 2000rpm). If the answer to the step S102 is affirmative (Yes), it is assumed that the catalyst temperature control need not be effected, and then the program proceeds to a step S105. On the other hand, if the answer to the step S102 is negative (NO), it is determined at a step S103 whether or not the catalyst bed temperature TC is higher than a second predetermined value TX2. This second predetermined TX2 is set at a value above which enhanced purification rates of exhaust gas components can be expected by enriching the air-fuel ratio as mentioned before, e.g. 650° C. (FIG. 1). This second predetermined value TX2 may of course be set at a value equal to the aforesaid first predetermined value TX1 (e.g. 700° C.). However, to avoid deterioration of the catalyst due to high temperature, it is more preferable to set the second predetermined value TX2 at a value (e.g. 650° C.) lower than the first predetermined value TX1. If the answer to the step S103 is negative (No), it is assumed that the air-fuel ratio need not be enriched, and then the program proceeds to the step S105, whereas if the answer to the step S103 is affirmative (Yes), the count value TM of the timer, which was reset to start at the step S34 in FIG. 4, is equal to 0 at a step S104 to determined whether or not a time period has elapsed after the start of increase of the exhaust gas recirculation amount, within which the air-fuel ratio A/F and the catalyst bed temperature TC become fully stable. If the answer is negative (No), the program proceeds to the step S105.

In the step S105, it is determined whether or not the intake pipe absolute pressure PBA is higher than a first predetermined value PBHWY (e.g. 310mmHg). If the answer to the step S105 is affirmative (Yes), i.e. if PBA>PBHWY, it is determined at a step S106 whether or not the engine rotational speed NE is higher than a predetermined value NHWY (e.g. 2,400rpm) which is lower than the predetermined value NHSFE (e.g. 3,900rpm) but higher than the predetermined value NX (e.g. 2,000rpm). If the answer to the step S105 is negative (No), or if the answer to the step S105 is affirmative (Yes) and at the same time the answer to the step S106 is negative (No), i.e. if PBA $\leq$ PBHWY, or PBA>PBHWY and NE$\leq$NHWY, the program proceeds to a step S107 wherein it is determined whether or not the intake pipe absolute pressure PBA is higher than a second predetermined value PBR (e.g. 410mmHg) which is higher than the first predetermined value PBHWY. If the answer is negative (No), i.e. if PBA$\leq$PBR, the correction value PR is set to a correction value PR1 for low load engine operation at a step S108. If the answer to the step S107 is affirmative (Yes), i.e. if PBA>PBR, the correction value PR is set to a correction value PR2 for high load engine operation, which is smaller than the correction value PR1, at a step S109, followed by executing the step S89 in FIG. 9. If the answer to the step S106 is affirmative (YES), the correction value PR is set to a predetermined value PRHWY for high speed and high load engine operation at a step S110, followed by executing the step S89. Thereafter, if the engine rotational speed NE exceeds the predetermined value NHSFE at the step S101 or if the count value TM of the timer TM is equal to 0 at the step S104, the correction value PR is set to a predetermined value PR 3 at a step S111 so as to enrich the air-fuel ratio A/F to a richer value (e.g. 14.3) than the stoichiometric air-fuel ratio, followed by executing the step S89. Then, the fuel injection period TOUT is calculated according to the equation (1) to thereby enrich the air-fuel ratio so that the catalyst bed temperature TC becomes lower than a value assumed if the air-fuel ratio is controlled to the stoichiometric air-fuel ratio.

Figure 11:
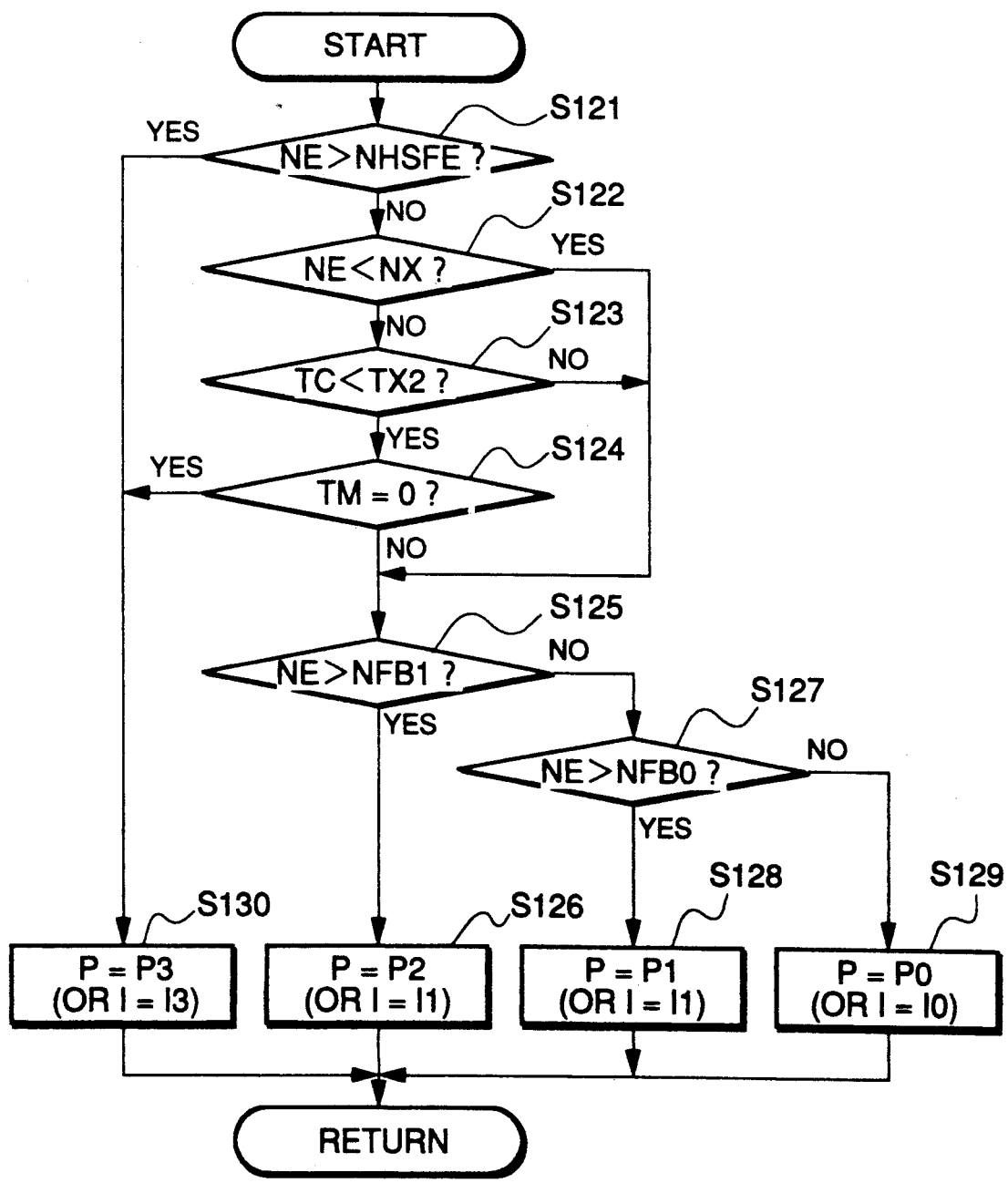
FIG. 11 is a flowchart showing a subroutine for calculating a correction value P (or a correction value I) by the air-fuel ratio enriching means.

FIG. 11 shows a subroutine for calculating the correction value P (or I), which is executed at the step S88 (or S93) in FIG. 9.

Similarly to the program of FIG. 10, first, it is determined at a step S21 whether or not the engine rotational speed NE is higher than the predetermined value NHSFE. If the answer is negative (No), it is further determined at a step S122 whether or not the engine rotational speed NE is lower than the predetermined value NX (e.g. 2000rpm). If the answer to the step S122 is affirmative (Yes), the program determined at a step S123 whether or not the catalyst bed temperature TC is higher than the second predetermined value TX2 lower than the first predetermining value TX1. If the answer to the step S123 is negative (No), the program proceeds to the step S125, whereas if the answer to the step S123 is affirmative (Yes), the count value TM of the timer TM, which was reset to start at the step S34 in FIG. 4, is equal to 0 at a step S124 to determine whether or not the air-fuel ratio A/F and the catalyst bed temperature TC has become fully stable after the start of increase of the exhaust gas recirculation amount. If the answer is negative (No), the program proceeds to the step S125.

In the step S125, it is determined whether or not the engine rotational speed NE is higher than a predetermined value NFB1 which is lower than the predetermined value NHSFE (e.g. 3,900rpm). If NE>NFB1, NFB1, the correction value P (or I) is set to a correction value P2 (or I2) dependent upon the engine rotational speed NE at a step S126, followed by terminating the program. If the answer to the step S125 is negative (No), i.e. if NE$\leq$NFB1, it is determined whether or not the engine rotational speed NE is higher than a predetermined value NFB0 which is lower than the predetermined value NFB1, at a step S127. If the answer is affirmative (Yes), i.e. if NFBO<NE≦NFB1, the correction value P (or I) is set to a value P1 (<P2) [or I1 (<I2)] dependent upon the engine rotational speed NE at a step S128, followed by terminating the program. On the other hand, if the answer to the step S127 is negative (No), i.e. if NE≦NFBO, the correction value P (or I) is set to a value PO (<P1) [or IO (<I1)] at a step S129, followed by terminating the program. Thereafter, if the engine rotational speed NE exceeds the predetermined value NHSFE at the step S121, or if the count value TM is equal to 0, the correction value P (or I) is set to a predetermined correction value P3 (>P2) [or I3 (<I2)] at a step S130 so as to enrich the air-fuel ratio A/F to a richer value (e.g. 14.3) than the stoichiometric air-fuel ratio, followed by executing the step S89 and calculating the fuel injection period TOUT by the equation (1) to enrich the air-fuel ratio and hence suppress an increase in the catalyst bed temperature.

In the above described manner, according to the present embodiment, it is so controlled that the air-fuel ratio is made richer than the stoichiometric air-fuel ratio after the lapse of the predetermined time period T2 after the start of increase of the exhaust gas recirculation amount by means of the program of FIG. 10 or FIG. 11, whereby the catalyst device can exhibit desired exhaust gas purifying performance without being deteriorated.

What is claimed is:

1. In a catalyst temperature control system for an internal combustion engine having an intake system, an exhaust system, a catalyst having a catalyst bed and arranged in said exhaust system for purifying noxious components in exhaust gases emitted from said engine, and an exhaust gas recirculation passage connected to said intake system and said exhaust system for returning part of said exhaust gases from said exhaust system to said intake system, the improvement comprising:

temperature detecting means for detecting a temperature of said catalyst bed of said catalyst;

exhaust gas recirculation amount-increasing means for increasing a recirculation amount of exhaust gases flowing through said exhaust gas recirculation passage, when said temperature of said catalyst bed detected by said temperature detecting means is higher than a first predetermined value; and air-fuel ratio enriching means for enriching the air-fuel ratio of a mixture supplied to said engine, when said temperature of said catalyst bed detected by said temperature detecting means is higher than a second predetermined time period after said exhaust gas recirculation amount-increasing means started to increase said recirculation amount.

2. A catalyst temperature control system as claimed in claim 1, wherein said first predetermined value is higher than said second predetermined value.

3. A catalyst temperature control system as claimed in claim 1, wherein said predetermined time period is a time period within which the air-fuel ratio of said mixture supplied to said engine and said temperature of said catalyst bed can become stable after the start of said increase of said recirculation amount by said exhaust gas recirculation amount-increasing means.

4. A catalyst temperature control system as claimed in any of claim 1-3, further including ignition timing correcting means for correcting ignition timing of said engine to an advanced side when and immediately after a second predetermined time period has elapsed after said exhaust gas recirculation amount-increasing means started to increase said recirculation amount.

5. A catalyst temperature control system as claimed in claim 4, wherein said second predetermined time period corresponds to a time lag from the start of increase of said recirculation amount by said exhaust gas recirculation amount-increasing means to the time of occurrence of an increase in an amount of exhaust gases returned to said intake system.

6. A catalyst temperature control system as claimed in any of claim 1-3, further including fuel amount correcting means for decreasing an amount of fuel supplied to said engine when and immediately after a second predetermined time period has elapsed after said exhaust gas recirculation amount-increasing means started to increase said recirculation amount.

7. A catalyst temperature control system as claimed in claim 6, wherein said second predetermined time period corresponds to a time lag from the start of increase of said recirculation amount-increasing means by said exhaust gas recirculation amount to the time of occurrence of an increase in an amount of exhaust gases returned to said intake system.

* * * * *